(12) United States Patent
Drozdenko et al.

(10) Patent No.: US 10,982,683 B2
(45) Date of Patent: Apr. 20, 2021

(54) FAN BLADE WITH ADHESIVE FABRIC STACKUP

(71) Applicant: UNITED TECHNOLOGIES CORPORATION, Farmington, CT (US)

(72) Inventors: Lee Drozdenko, Bristol, CT (US); James O. Hansen, Glastonbury, CT (US); Jesse C. Meyer, Colchester, CT (US); Maria C. Kirejczyk, Middletown, CT (US); Scot A. Webb, Gales Ferry, CT (US); Brandon A. Gates, DeWitt, MI (US); Richard B. Bergethon, Holt, MI (US)

(73) Assignee: Raytheon Technologies Corporation, Farmington, CT (US)

(*) Notice: Subject to any disclaimer, the term of this patent is extended or adjusted under 35 U.S.C. 154(b) by 1056 days.

(21) Appl. No.: 15/039,929

(22) PCT Filed: Nov. 25, 2014

(86) PCT No.: PCT/US2014/067312
§ 371 (c)(1),
(2) Date: May 27, 2016

(87) PCT Pub. No.: WO2015/099937
PCT Pub. Date: Jul. 2, 2015

(65) Prior Publication Data
US 2017/0023010 A1     Jan. 26, 2017

Related U.S. Application Data

(60) Provisional application No. 61/919,984, filed on Dec. 23, 2013.

(51) Int. Cl.
*F04D 29/38* (2006.01)
*B32B 7/12* (2006.01)
(Continued)

(52) U.S. Cl.
CPC ............. *F04D 29/388* (2013.01); *B32B 5/024* (2013.01); *B32B 7/12* (2013.01); *B32B 15/14* (2013.01);
(Continued)

(58) Field of Classification Search
CPC . F01D 5/147; F01D 5/28; F01D 5/282; F01D 5/286; F04D 29/388; F04D 29/023;
(Continued)

(56) References Cited

U.S. PATENT DOCUMENTS 6,303,068 B1 * 10/2001 Kerr ..................... A47L 23/266
                                                    264/293
2010/0254821 A1 * 10/2010 Parkin ................. B29C 65/5057
                                                    416/241 R (Continued)

FOREIGN PATENT DOCUMENTS

EP      2353830 A2    10/2011

OTHER PUBLICATIONS

American Heritage Dictionary of the English Language (5th Ed. 2016) (last accessed Sep. 21, 2020), https://www.thefreedictionary.com/scrim.*

(Continued)

*Primary Examiner* — Brian P Wolcott
*Assistant Examiner* — Aye S Htay
(74) *Attorney, Agent, or Firm* — Carlson, Gaskey & Olds, P.C.

(57) ABSTRACT

A blade comprises an airfoil extending from a trailing edge to a leading edge. The airfoil includes a body formed of an aluminum containing material. A sheath is at the leading edge and is formed of a titanium containing material. A sandwich is positioned intermediate the sheath and the airfoil body, the sandwich including an outer adhesive layer adjacent the sheath, an intermediate fabric layer and an inner
(Continued)

adhesive layer adjacent the body. A gas turbine engine is also disclosed.

16 Claims, 2 Drawing Sheets

(51) Int. Cl.
| | |
|---|---|
| *F01D 5/28* | (2006.01) |
| *F01D 5/14* | (2006.01) |
| *F01D 5/12* | (2006.01) |
| *B32B 5/02* | (2006.01) |
| *B32B 15/14* | (2006.01) |
| *B32B 15/20* | (2006.01) |
| *F04D 29/02* | (2006.01) |
| *F04D 29/32* | (2006.01) |

(52) U.S. Cl.
CPC ............... *B32B 15/20* (2013.01); *F01D 5/12* (2013.01); *F01D 5/14* (2013.01); *F01D 5/147* (2013.01); *F01D 5/28* (2013.01); *F01D 5/282* (2013.01); *F01D 5/286* (2013.01); *F01D 5/288* (2013.01); *F04D 29/023* (2013.01); *F04D 29/325* (2013.01); *B32B 2262/101* (2013.01); *B32B 2603/00* (2013.01); *F05D 2220/36* (2013.01); *F05D 2240/303* (2013.01); *F05D 2300/121* (2013.01); *F05D 2300/133* (2013.01); *F05D 2300/6012* (2013.01)

(58) Field of Classification Search
CPC ......... F04D 29/325; B32B 5/024; B32B 7/12; B32B 15/14; B32B 15/20; B32B 2262/101
See application file for complete search history.

(56) References Cited

U.S. PATENT DOCUMENTS

| | | |
|---|---|---|
| 2012/0061243 A1 | 3/2012 | Smith et al. |
| 2013/0220537 A1 | 8/2013 | Parkin |
| 2013/0239586 A1* | 9/2013 | Parkin .................... F01D 5/147 60/805 |

OTHER PUBLICATIONS

Collins English Dictionary (12th Ed. 2020) (last accessed Sep. 21, 2020), https://www.thefreedictionary.com/scrim.*
International Preliminary Report on Patentability for International Application No. PCT/US2014/067312 dated Jul. 7, 2016.
International Search Report and Written Opinion for PCT Application No. PCT/US2014/067312, dated Mar. 27, 2016.
Supplementary European Search Report for European Application No. 14875792.5 dated Sep. 27, 2017.

* cited by examiner

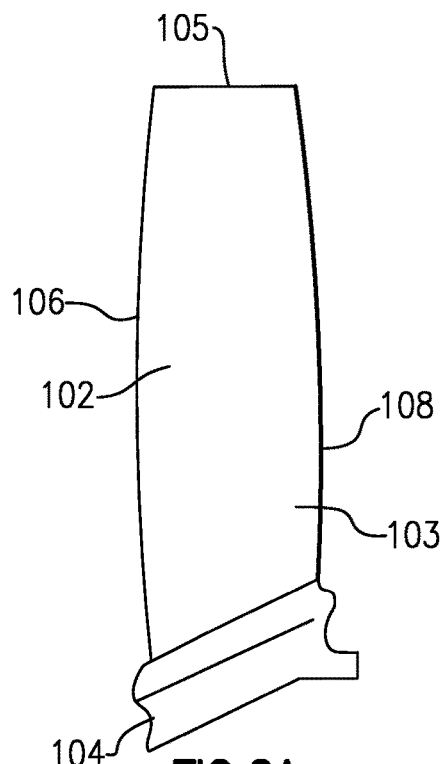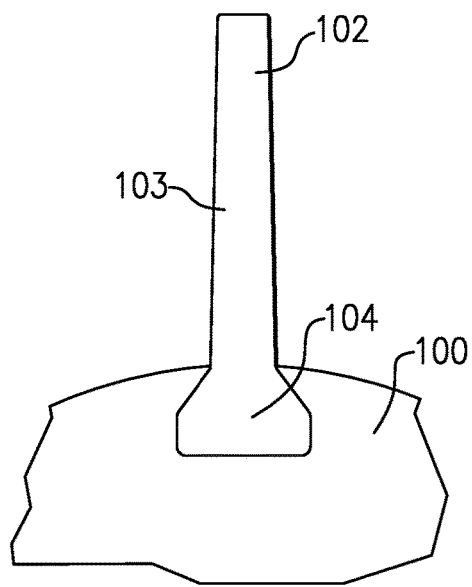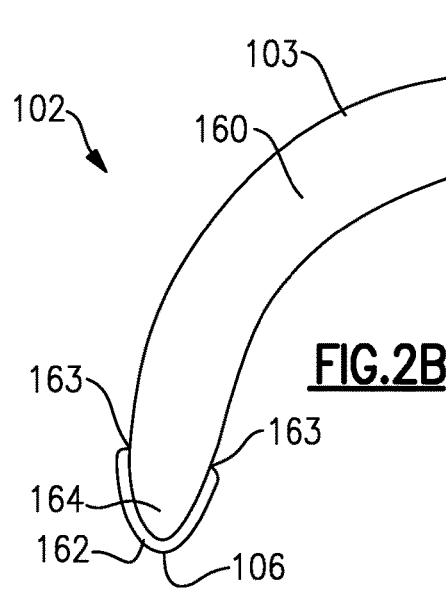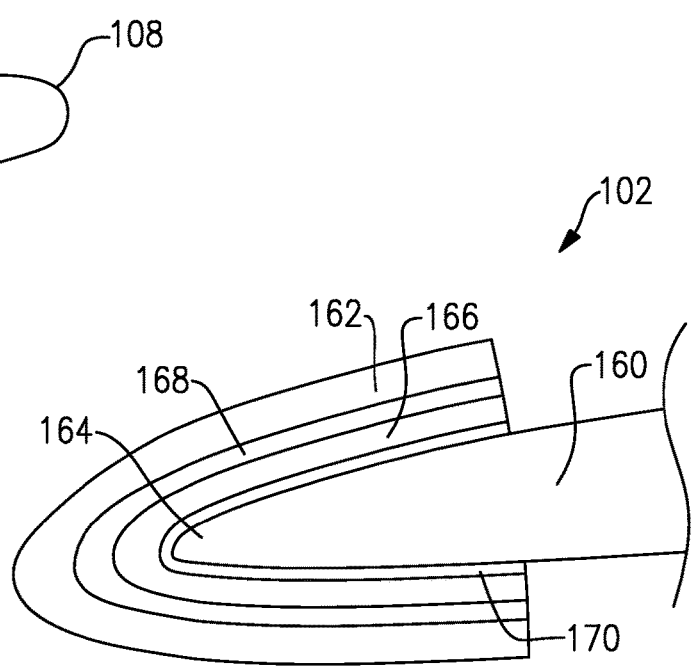

FAN BLADE WITH ADHESIVE FABRIC STACKUP

CROSS-REFERENCE TO RELATED APPLICATION

This application claims priority to U.S. Provisional Patent Application No. 61/919,984, filed Dec. 23, 2013.

BACKGROUND OF THE INVENTION

This application relates to an adhesive and fabric stackup utilized between a sheath and a fan blade.

Gas turbine engines are known and include a fan delivering air into a bypass duct as propulsion air. Air also passes into a core engine. The air passing to the core engine leads to a compressor. The air is compressed and delivered into a combustion section where it is ignited. Products of this combustion pass downstream over turbine rotors, driving them to rotate.

Historically, the fan blade was rotated at the same speed as a turbine rotor. This was a limitation on the speed of the turbine rotor as the fan blade could not rotate at unduly high speeds.

More recently, it has been proposed to include a gear reduction between a fan drive turbine and the fan. This has allowed the diameter of the fan blade to increase dramatically as the speed of the fan has been decreased.

With this change in size of the fan blade, weight has also increased. To reduce the weight, the fan blades may be formed of aluminium. However, the leading edge of the fan blade is subject to challenges and, thus, a sheath, which may be formed of titanium, has been included at the leading edge.

If there is contact between the titanium sheath and the aluminium fan blade body, there can be a phenomenon known as galvanic corrosion which can damage the fan blade. Thus, it is known to isolate the sheath material from the fan blade body.

In the prior art, various techniques have been provided. As an example, it has been proposed to include a scrim material between the sheath and blade. This material has not been as successful as would be desired.

SUMMARY OF THE INVENTION

In a featured embodiment, a blade comprises an airfoil extending from a trailing edge to a leading edge. The airfoil includes a body formed of an aluminum containing material. A sheath is at the leading edge and is formed of a titanium containing material. A sandwich is positioned intermediate the sheath and the airfoil body, the sandwich including an outer adhesive layer adjacent the sheath, an intermediate fabric layer and an inner adhesive layer adjacent the body.

In another embodiment according to the previous embodiment, the fabric layer is a woven fabric layer.

In another embodiment according to any of the previous embodiments, the woven fabric layer is a fiberglass fabric.

In another embodiment according to any of the previous embodiments, the woven fabric layer has holes that are less than 0.001 inch on average.

In another embodiment according to any of the previous embodiments, the woven fabric layer is between 0.005 and 0.010 inch in thickness.

In another embodiment according to any of the previous embodiments, the inner and outer adhesive layers are epoxy adhesives.

In another embodiment according to any of the previous embodiments, the inner and outer adhesive layers have an aerial weight of between 0.035 and 0.060 lb/sq ft.

In another embodiment according to any of the previous embodiments, the blade is a fan blade for a gas turbine engine.

In another embodiment according to any of the previous embodiments, the fabric layer has holes that are less than 0.001 inch on average.

In another embodiment according to any of the previous embodiments, the fabric layer is between 0.005 and 0.010 inch in thickness.

In another featured embodiment, a gas turbine engine comprises a fan rotor including a plurality of blades. The fan blades include an airfoil extending from a trailing edge to a leading edge. The airfoil has a body formed of an aluminum containing material. A sheath at the leading edge is formed of a titanium containing material, with a sandwich positioned intermediate the sheath and the airfoil body. The sandwich includes an outer adhesive layer adjacent the sheath, an intermediate fabric layer and an inner adhesive layer adjacent the body.

In another embodiment according to the previous embodiment, the fabric layer is a woven fabric layer.

In another embodiment according to any of the previous embodiments, the woven fabric layer is a fiberglass fabric.

In another embodiment according to any of the previous embodiments, the woven fabric layer has holes that are less than 0.001 inch on average.

In another embodiment according to any of the previous embodiments, the woven fabric layer is between 0.005 and 0.010 inch in thickness.

In another embodiment according to any of the previous embodiments, the inner and outer adhesive layers are epoxy adhesives.

In another embodiment according to any of the previous embodiments, the inner and outer adhesive layer have an aerial weight between 0.035 and 0.060 lb/sq ft.

In another embodiment according to any of the previous embodiments, the fabric layer has holes that are less than 0.001 inch on average.

In another embodiment according to any of the previous embodiments, the fabric layer is between 0.005 and 0.010 inch in thickness.

In another embodiment according to any of the previous embodiments, the fabric layer is between 0.005 and 0.010 inch in thickness.

These and other features may be best understood from the following drawings and specification.

BRIEF DESCRIPTION OF THE DRAWINGS

FIG. 1B shows a fan rotor.
FIG. 2A shows a detail of the fan blade.
FIG. 2B shows a further detail.
FIG. 3 shows an enlarged view of a leading edge of a fan blade.

DETAILED DESCRIPTION

Figure 1A:
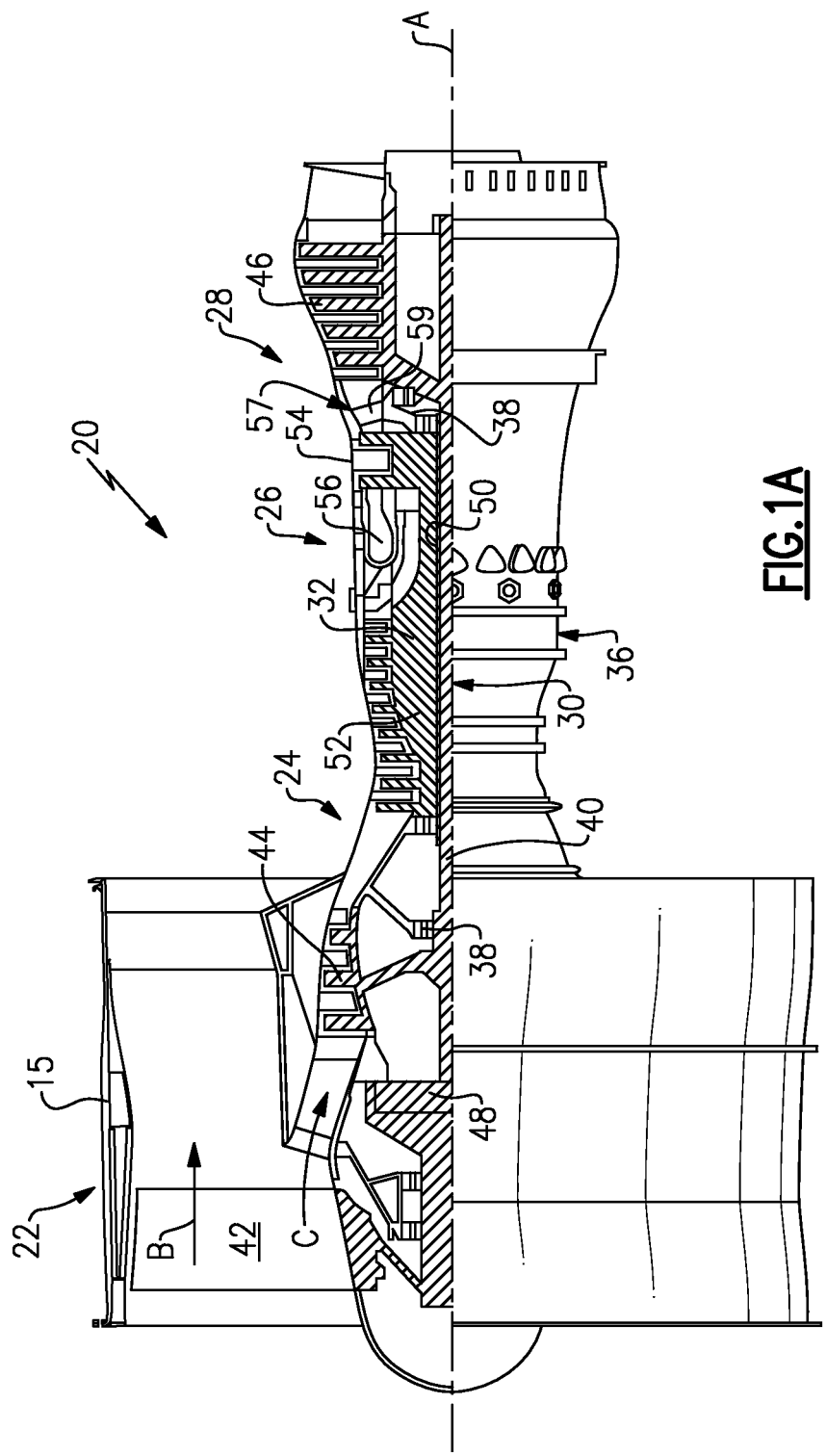
FIG. 1A schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

A fan rotor 100 is shown receiving a fan blade 102. This may be included in an engine such as the engine 20 of FIG. 1A.

The fan blade 102 has a dove tail 104 received in a slot in the fan rotor 100, and an airfoil 103.

As shown in FIG. 2A, the airfoil 103 extends from the dove tail 104 radially outward to a radially outer tip 105. The airfoil 103 extends from a leading edge 106 to a trailing edge 108.

As shown in FIG. 2B, the fan blade 102 has a fan blade body 160 forming a portion of the airfoil 103, and defining the trailing edge 108. The fan blade body 160 has a leading edge portion 163, and a sheath 162 is positioned at the leading edge portion 164 to define the leading edge 106 of the overall fan blade 102. In embodiments, the fan blade body 160 may be formed of aluminum while the sheath 162 may be formed of titanium. The two members may be formed of aluminum and titanium containing alloys, respectively. Generally, the body 102 is formed of an aluminum containing material, and the sheath of a titanium containing material. The sheath 162 is shown extending between ends 163. In practice, the fan blade body 160 may be formed with hollows to further reduce weight. The hollows may contain filler materials typically comprising materials of made from a lesser density.

FIG. 3 shows a sandwich between the sheath 162 and the airfoil body 160. The sandwich includes an adhesive layer 168 adjacent the sheath 162, an intermediate fabric layer 166, and an inner adhesive layer 170 adjacent the fan blade body 160.

FIG. 3 shows the sheath 162 received at the leading edge 164 of a fan blade body 160. As shown, the sandwich of an adhesive layer 170, a fabric layer 166 and an adhesive layer 168 is positioned between the sheath 162 and the fan blade body 160.

The fabric 166 is preferably a woven fabric. In one example, the fabric may be a fiberglass fabric. The fabric may be an 8 harness satin weave woven fabric. In embodiments, the fabric may be between 0.005 inch (0.013 cm) and 0.010 inch (0.033 cm) in average thickness. A 7781 glass fabric with a 550 finish may be utilized.

The adhesive layers may be epoxy adhesive layers. The adhesive layers may have an aerial weight of between 0.035 and 0.060 lbs/sq ft.

The woven fabric is tightly woven. Holes between the fibers are less than 0.001 inch (0.002 cm). In embodiments, they may be less than 0.0005 inch (0.001 cm). In fact, the woven fabric may effectively have no holes whatsoever, with each of the fibers in contact with each other. Still, to the extent there are holes in any fabric utilized within this teaching, they are exceedingly small. Any numbers mentioned above are on average.

In some alternative systems, a scrim has been proposed. The scrim has holes more on the order of $1/16^{th}$ of an inch (0.062 cm).

The adhesive layers 168 and 170 sandwich the fabric layer 166 and may be included between the sheath 162 and body 160. Prior to use in bonding, they may be placed in an autoclave and pressurized at 100 psi, and 150° F., for example, for one hour. Vacuum of at least 28 inches of mercury may be utilized. The adhesive layers impregnate the fabric and results in good bond strength, and very effective insulation or isolation between the two materials of sheath 162 and body 160 after bonding of the sheath to the blade body is complete.

In one embodiment, the sandwich of the adhesive layers 168 and 170 and the fabric layer 166 are autoclaved to be prepared, and then utilized to bond the sheath to the blade body in a separate autoclave operation. However, any number of other techniques may be utilized to prepare the sandwich and attach the sheath to the blade body.

Ideally, the sandwich would extend the entire radial length of the sheath.

It should be understood that FIG. 3 exaggerates the thickness of the combined layers to better illustrate the several layers.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A blade comprising:
an airfoil extending from a trailing edge to a leading edge, said airfoil including a body formed of an aluminum containing material;
a sheath at said leading edge and formed of a titanium containing material, with a sandwich positioned intermediate said sheath and said airfoil body, said sandwich including an outer adhesive layer adjacent the sheath, an intermediate fabric layer and an inner adhesive layer adjacent the body;
wherein said fabric layer is a woven fabric layer; and
wherein said woven fabric layer has holes that are less than 0.001 inch on average.

2. The blade as set forth in claim 1, wherein said woven fabric layer is a fiberglass fabric.

3. The blade as set forth in claim 2, wherein said woven fabric layer is between 0.005 and 0.010 inch in thickness.

4. The blade as set forth in claim 2, wherein said inner and outer adhesive layers are epoxy adhesives.

5. The blade as set forth in claim 4, wherein said inner and outer adhesive layers have an aerial weight of between 0.035 and 0.060 lb/sq ft.

6. The blade as set forth in claim 1, wherein said blade is a fan blade for a gas turbine engine.

7. The blade as set forth in claim 1, wherein said fabric layer has holes that are less than 0.0005 inch on average.

8. The blade as set forth in claim 1, wherein said fabric layer is between 0.005 and 0.010 inch in thickness.

9. A gas turbine engine comprising:
a fan rotor including a plurality of blades, with said fan blades including an airfoil extending from a trailing edge to a leading edge, said airfoil having a body formed of an aluminum containing material;
a sheath at said leading edge formed of a titanium containing material, with a sandwich positioned intermediate said sheath and said airfoil body, said sandwich including an outer adhesive layer adjacent the sheath, an intermediate fabric layer and an inner adhesive layer adjacent the body;
wherein said fabric layer is a woven fabric layer; and
wherein said woven fabric layer has holes that are less than 0.001 inch on average.

10. The gas turbine engine as set forth in claim 9, wherein said woven fabric layer is a fiberglass fabric.

11. The gas turbine engine as set forth in claim 10, wherein said woven fabric layer is between 0.005 and 0.010 inch in thickness.

12. The gas turbine engine as set forth in claim 9, wherein said inner and outer adhesive layers are epoxy adhesives.

13. The gas turbine engine as set forth in claim 12, wherein said inner and outer adhesive layer have an aerial weight between 0.035 and 0.060 lb/sq ft.

14. The gas turbine engine as set forth in claim 9, wherein said fabric layer has holes that are less than 0.0005 inch on average.

15. The gas turbine engine as set forth in claim 14, wherein said fabric layer is between 0.005 and 0.010 inch in thickness.

16. The gas turbine engine as set forth in claim 9, wherein said fabric layer is between 0.005 and 0.010 inch in thickness.

* * * * *